US011608088B2

(12) United States Patent
Karve

(10) Patent No.: US 11,608,088 B2
(45) Date of Patent: Mar. 21, 2023

(54) OPTICS BASED DETECTION OF HANDS ON-OFF AND HAND GESTURE BASED FUNCTION SELECTION FOR HUMAN DRIVER

(71) Applicants: Continental Automotive Systems, Inc., Auburn Hills, MI (US); Steering Solutions IP Holding Corporation, Auburn Hills, MI (US)

(72) Inventor: Omkar Karve, Farmington Hills, MI (US)

(73) Assignees: Continental Automotive Systems, Inc., Auburn Hills, MI (US); Steering Solutions IP Holding Corporation, Auburn Hills, MI (US)

( * ) Notice: Subject to any disclaimer, the term of this patent is extended or adjusted under 35 U.S.C. 154(b) by 146 days.

(21) Appl. No.: 17/066,983

(22) Filed: Oct. 9, 2020

(65) Prior Publication Data

US 2021/0107527 A1 Apr. 15, 2021

Related U.S. Application Data

(60) Provisional application No. 62/914,650, filed on Oct. 14, 2019.

(51) Int. Cl.
*B60W 60/00* (2020.01)
*B62D 1/16* (2006.01)
*B60W 40/08* (2012.01)
*B62D 1/06* (2006.01)

(52) U.S. Cl.
CPC ........ *B60W 60/0055* (2020.02); *B60W 40/08* (2013.01); *B62D 1/06* (2013.01); *B62D 1/16* (2013.01); *B60W 2420/42* (2013.01); *B60W 2510/202* (2013.01); *B60W 2540/223* (2020.02)

(58) Field of Classification Search
CPC ............ B60W 60/0055; B60W 40/08; B60W 2420/42; B60W 2510/202; B60W 2540/223; B60W 40/09; B60W 60/001; B62D 1/06; B62D 1/16; B62D 1/286; B62D 15/025; B62D 1/046; B62D 15/02; B62D 1/02
USPC ......................................................... 701/26
See application file for complete search history.

(56) References Cited

U.S. PATENT DOCUMENTS

| 9,469,340 B2* | 10/2016 | Morselli ................ B62D 6/007 |
| 2017/0344838 A1* | 11/2017 | Zhou ...................... G06V 40/28 |
| 2018/0029640 A1* | 2/2018 | Otto ........................ G05D 1/021 |
| 2018/0194349 A1* | 7/2018 | McGill, Jr. ........... B60W 30/10 |

(Continued)

FOREIGN PATENT DOCUMENTS

| DE | 102011111897 A1 | 2/2013 |
| DE | 102014107194 A1 | 11/2015 |

(Continued)

OTHER PUBLICATIONS

German Office Action dated Jan. 20, 2023; Application No. 10 2020 127 049.6; Applicant: Continental Automotive Systems, Inc. et al.; 15 pages.

*Primary Examiner* — Jonathan M Dager
*Assistant Examiner* — Jean W Charleston
(74) *Attorney, Agent, or Firm* — Brooks Group, PLC

(57) ABSTRACT

A number of illustrative variations may include a method or product for sensing driver intervention in an autonomous steering system.

22 Claims, 6 Drawing Sheets

(56) References Cited

U.S. PATENT DOCUMENTS

2018/0224847 A1\* 8/2018 El Aile ................ B62D 15/025
2019/0054950 A1\* 2/2019 Farhat .................. G05D 1/0061

FOREIGN PATENT DOCUMENTS

DE 102016210452 A1 12/2017
DE 112017005199 T5 7/2019

\* cited by examiner

OPTICS BASED DETECTION OF HANDS ON-OFF AND HAND GESTURE BASED FUNCTION SELECTION FOR HUMAN DRIVER

CROSS-REFERENCE TO RELATED APPLICATIONS

This application claims the benefit of U.S. Provisional Application Ser. No. 62/914,650 filed Oct. 14, 2019.

TECHNICAL FIELD

The field to which the disclosure generally relates to includes steering systems.

BACKGROUND

Vehicles typically include steering systems. Diffusion of camera based hands detection along with other sensors in a steering system or other monitoring system to interpret driver's intention is known. Known capacitive strips that can be installed on the steering wheel which can give some improved capability but they may also depend upon physical touch and interpreting driver's intention is difficult using the same. Interpreting driver's intention based purely on toucher torque does not provide necessary input to initialize or prime autonomous driving assistant systems function a reliable fashion.

SUMMARY OF ILLUSTRATIVE VARIATIONS

A number of illustrative variations may include a method or product for sensing driver intervention in an autonomous steering system.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
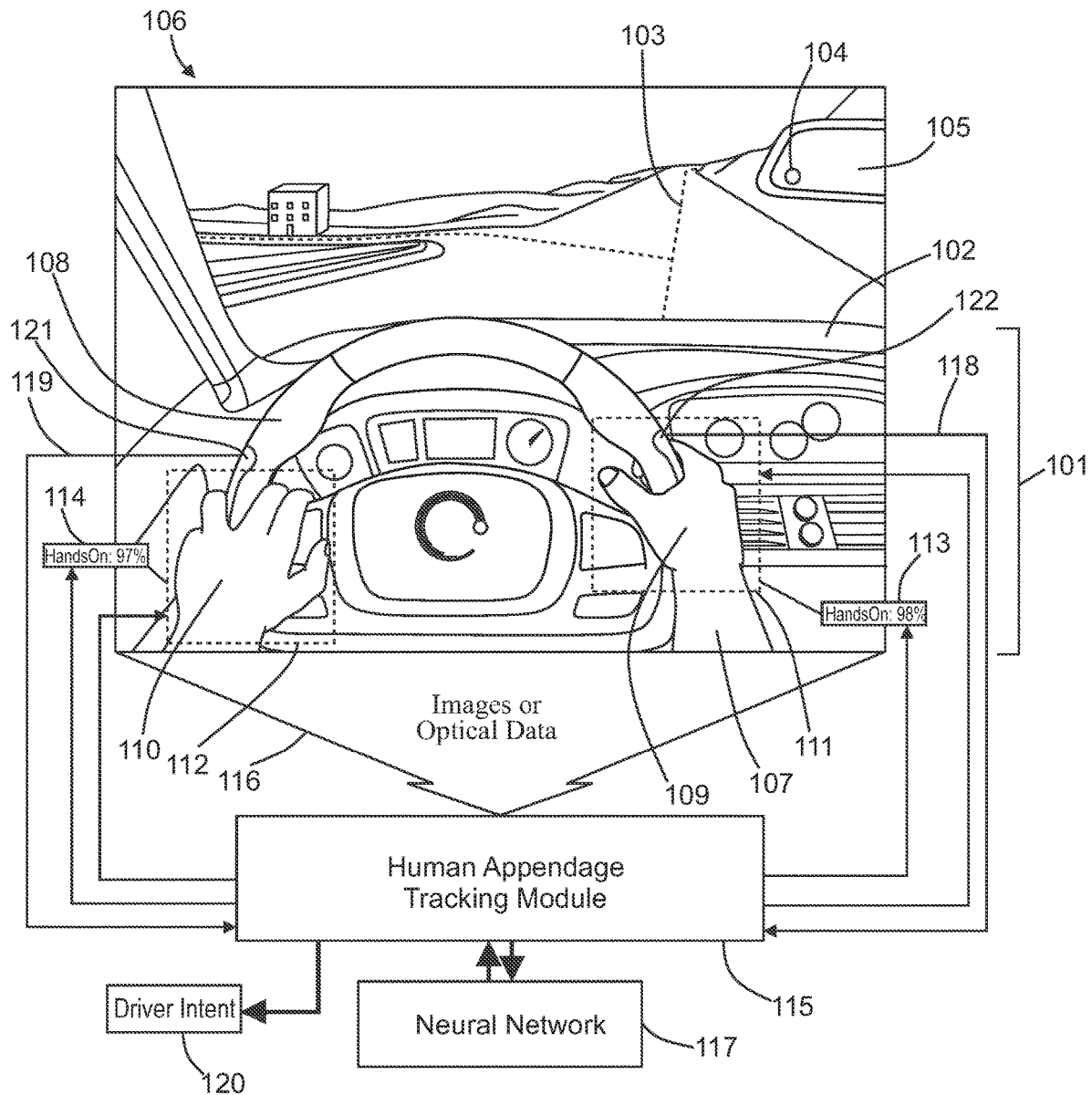
FIG. 1 depicts an illustrative variation in which an image representative of a camera image or optical sensor data depicting a human driver interacting with a steering interface of an autonomous steering system is being analyzed and marked by a human appendage tracking module. In this illustrative variation, the human appending tracking module utilizes data from at least one optical sensor or an image from at least one camera to determine that a human driver wishes to take control of a steering interface based at least upon at least one of the human driver's hand position or hand pose characteristics according to a number of variations.

The following description of the variations is merely illustrative in nature and is in no way intended to limit the scope of the invention, its application, or uses.

In a number of illustrative variations, a vehicle for cargo or passengers may be driven ahead by an automotive power derived from a motor that transforms a source of stored energy into a driving force for the vehicle such as but not limited to an internal combustion engine, a battery powered engine, a fuel-cell powered engine, or any other known motor for providing automotive driving power for a passenger or cargo vehicle. The driving force that results from the transformation of stored energy by the motor may be communicated from the motor to a driving medium along which the vehicle will travel such as but not limited to a tract of land, a road, a waterway, an airway, or any other medium along which vehicles are known to travel through space. The communication of the driving force from the motor to the driving medium may occur via any means of driven automotive vehicle movement such as but not limited to roadwheels, treads, casters, rollers, propellers, gas thrusters, liquid thrusters, or ion driven thrusters, or any other known means of driven automotive vehicle movement.

As used herein, "wheels" or "wheel," even when modified by a descriptive adjective such as but not limited to in the recitation of "steerable roadwheels," "steerable wheels," "road wheels," or "driven wheels," may refer to a traditional road wheel and tire arrangement, but may also refer to any modification to the traditional road wheel and tire arrangement such as but not limited to rimless mag-lev tires, ball tires, or any other known means of automotive movement such as but not limited to treads, casters, rollers, propellers, or gas thrusters, liquid thrusters, or ion driven thrusters.

As used herein, "road," even when modified by a descriptive adjective may refer to a traditional driving surface road such as but not limited to a concrete or asphalt road but may also refer to any driving surface or medium along which or through which a vehicle for cargo or passengers may travel such as but not limited to water, ice, snow, dirt, mud, air or other gases, or space in general.

As used herein, "appendage" even when modified by a descriptive adjective may refer to a hand, a finger, a forearm, an elbow, and arm, a shoulder, a neck, a head, a thigh, a knee, a lower leg, a foot, a toe, or any other body part.

As used herein, "zone of observation" may refer to a point, area, or zone that at least one sensor or camera is configured to collect data from. As a non-limiting example, if a camera is generally directed to collect images of a handwheel, "zone of observation" may refer to the handwheel but may also refer to any point captured in the image. As another non-limiting example, if a sensor is configured to collect data at the point of the sensor or at a point remote from the sensor, the point from which the data is collected may be referred to as the "zone of observation." As used herein, "zone of observation" may also refer to the area of an image that at least one module is configured to analyze, or the set of data collected from sensors that at least one module is configured to analyze. To that end, as used herein "observe" may refer to the use of a camera or sensor's ability to collect data at the point of the sensor or at a point remote from the sensor.

As used herein, "gesture" even when modified by a descriptive adjective may refer to the pose or position of at least one appendage of a human driver.

In a number of illustrative variations, a vehicle may have a steering system that allows a driver to change the vehicle's direction or divert it from a path that it may be traveling in. This steering system may operate in conjunction with a source of driven automotive vehicle movement such as a pair of driven roadwheels. As a non-limiting example, a vehicle may be equipped with an internal combustion engine that mechanically drives a pair of rear roadwheels to propel the vehicle forward along a road. In such an example, the vehicle may additionally equipped with a set of steerable front roadwheels that may be manipulated by the steering system via a steering interface such as but not limited to a handwheel to steer the vehicle to the left and to the right as the vehicle travels down the road. In such an example, the driven rear roadwheels serve as the means of driven automotive vehicle movement, and the steerable pair of front roadwheels as manipulated by the steering interface serves as the steering system. Importantly, this is not the only means by which a vehicle is contemplated as being driven or steered in this disclosure. Indeed, in a number illustrative variations the front roadwheels may be the driven roadwheels as well as the steerable roadwheels. Similarly, the means of driven automotive vehicle movement does not need to be of the same kind as the steering means. That is, if the means of driven automotive vehicle movement comprises roadwheels, the steering means does not need to also comprise roadwheels. To that end, as a non-limiting example, it is contemplated that a snowmobile may be driven by a set of treads toward the rear of the vehicle and steered by a set of steerable skis toward the front of the vehicle. Additionally, it is contemplated that the means of driven automotive vehicle movement, such as but not limited to driven roadwheels, and the steering means, such as but not limited to steerable roadwheels, may change function or oscillate in function while in operation. As a non-limiting example, a vehicle comprising a pair of driven roadwheels near the rear of the vehicle and further comprising a pair of steerable roadwheels near the front of the vehicle may change driving modes and begin to utilize every roadwheel available, including the front steerable roadwheels, as driven roadwheels while still maintaining the steerable property and steering function of the front steerable roadwheels. It is similarly contemplated that driven roadwheels may be intermittently or optionally used as steerable roadwheels in some cases.

In a number of illustrative variations, a vehicle's steering system may also be autonomous in that the vehicle may steer itself toward a predetermined location that has been communicated to it without assistance or interference from a driver. The vehicle may have an obstacle avoidance system that allows the vehicle to sense objects in its path and avoid them. In some cases, a human driver of the vehicle may wish to assist the vehicle in avoiding an object, or to change direction of travel of the vehicle. In such a case, the driver may take control of at least one driver-side steering system control or at least one steering interface and assist the autonomous steering system. As the driver moves to place at least one human driver appendage on the steering interface, an optical sensing system or imaging system comprising at least one optical sensor or camera may collect images or optical data to be analyzed by a human appendage tracking module in order to determine if the human driver intends to commandeer the task of steering or driving from the autonomous steering system. If the human appendage tracking module alone is not able to determine the human driver's intent, the human appendage tracking module may correlate the analyzed image or optical data to sensor data from sensors embedded in or associated with any steering interface that the human driver appears to be attempting to commandeer from the analysis of the optical sensor or image data. In some such cases, the sensor data from sensors embedded in or associated with any steering interface that the human driver appears to be attempting to commandeer may include sensor data such as but not limited to pressure data from a pressure sensor embedded in a steering interface, touch data from a touch sensor embedded in a steering interface, torque data from any torque sensors associated with a steering interface such as but not limited to a torque sensor embedded in or associated with a steering column for a handwheel, a position sensor associated with a steering interface such as but not limited to a position sensor embedded in or associated with a steering column for a handwheel, or any other sensor known to be used to provide useful data about the manipulation of a steering interface by a human user.

In a number of illustrative variations, optical sensing system or imaging system comprising at least one optical sensor or camera may be positioned above or behind the human driver within the vehicle cabin. In some cases optical sensing system or imaging system may be positioned at one of the human driver's sides or in front of the human driver on the ceiling of the vehicle cabin, so long as the zone of observation for the optical sensing system or imaging system is still properly configured to observe human appendage gestures by a human driver or interactions with a steering interface by a human driver. In some cases, the optical sensing system or imaging system need not be immediately focused on an associated zone of observation but may be indirectly focused by use of at least one mirror. As a non-limiting example, an optical sensing system or imaging system may be positioned near the rear of the vehicle cabin and aimed at a mirror positioned on the ceiling of the vehicle. In such a case, the mirror may be so positioned to allow the optical sensing system or imaging system to properly observe an associated zone of observation.

In a number of illustrative variations, in order to foster a cooperative steering system, the sensors of an autonomous steering system may be configured to detect and identify steering input as driver input. An accurate identification of driver input may include the use of a neural network for image analysis to identify and track human driver appendage movement, positions, poses, and gestures, as disclosed herein, in combination with the use of simpler sensing methods such as the detection of human driver grip on a steering interface or human-driver originated force, manipulation, or touch on a steering interface with the use of dedicated sensors embedded in the steering interface or indirectly associated with the steering interface. Correlating the image analysis to data from the aforementioned simpler sensing methods yields an advantageously enhanced method of determining human driver intent for use in accurately interpreting human driver input within an autonomous steering system.

In a number of illustrative variations, the logic of any autonomous steering module may respond to autonomous input as well as driver input. The human driver input may be associated with a human driver intent. In some cases, full steering control may be relinquished to the human driver if the human driver intent reaches a certain threshold. In some cases, full steering control may be reserved solely to the autonomous input if the steering system or some other system presiding over the steering system determines that driver input should not be given precedent or adjudges that human driver intent is low or absent. As a non-limiting example, the autonomous input may be given sole control of the steering system, to the exclusion of human driver input, in a situation in which it is determined by autonomous steering modules that the human driver is very likely to have accidentally interacted with a steering interface or inadvertently made a recognized gesture.

In a number of illustrative variations, a vehicle may comprise a steering system comprising a steering interface, and a set of steerable roadwheels. The steering system may be of the electric power steering type wherein physical linkages mechanically communicate a manipulation of the steering interface to the steerable wheels. The steering system may be of the steer-by-wire type wherein physical mechanisms do not mechanically communicate a manipulation of the steering interface to the steerable roadwheels and wherein a manipulation of the steering interface affects an associated manipulation of the steerable roadwheels via the communication of electronic devices such as but not limited to sensors, transceivers and electronically excited actuators. In such a system, a steering interface manipulation system may comprise actuators or electromagnets or the like for producing at least visual steering feedback in the case where the manipulated steering interference is a mechanically manipulatable steering interface such as but not limited to a handwheel. In a steering system with a digital steering interface, a steering interface manipulation system may comprise any logic modules used in determining how to update any digital data displayed on any digital display for the digital steering interface. Thus, if the driver desires to cooperate or intervene in the automated steering, the driver may be less disoriented when attempting to commandeer a steering interface because the steering interface has been autonomously manipulated in a manner commensurate with the actual steering maneuvers of the vehicle.

In a number of illustrative variations, a vehicle comprises an electronic power steering system. In such a case, the steering interface mechanically communicates with any mechanism used to steer the vehicle according to a steering ratio. Thus, if a vehicle comprising an electronic power steering system comprises fully autonomous steering or semi-autonomous steering that allows driver cooperation or intervention, the steering system may communicate visual feedback from steering on any interface by which the driver may steer the vehicle. As a non-limiting example, when engaged in fully autonomous steering, a vehicle may automatically rotate a vehicle's handwheel in conjunction with the autonomous steering system turning the vehicle's steerable roadwheels such that a non-intervening or non-cooperating driver may associate the automatic turning of the vehicle's handwheel with the turning of the vehicle's steerable roadwheels and intuit, surmise, or estimate the steering commands of the autonomous steering system. Thus, if the driver desires to cooperate or intervene in the automated steering, the driver may be less disoriented when attempting to commandeer a steering interface that seems to be unassociated or misaligned with the vehicle's steerable roadwheels.

In a number of illustrative variations, a steering ratio is defined as the ratio describing a relationship between the affectation of a steering interface to the affectation of a steering device. As a non-limiting example, a steering ratio for a boat may be defined as the ratio relating how far a rudder of the boat turns in response to a rotation of a captain's wheel. As another non-limiting example, a steering ratio for an aircraft may be defined as a ratio relating how far an aileron of the aircraft raises or lowers in response to a turning of a pilot's control wheel. As yet another non-limiting example, a steering ratio for a wheeled vehicle may be defined as a ratio relating how far a vehicle's steerable roadwheels turn in response to a turning of a handwheel.

In a number of illustrative variations, any autonomous manipulation of any steering interface may be controlled by the autonomous steering system in order to make the driving and riding experience more comfortable and intuitive to a driver during any transition to or from autonomous driving, cooperative driving, or entirely driver-controlled driving modes. In such illustrative variations, an autonomous manipulation of the steering interface may act as visual steering feedback that allows the driver to intuit or surmise the steering commands being communicated to and interpreted by the autonomous steering system and how those commands affect the steering of the vehicle via a concurrent, associated, autonomous manipulation of the steering interface. To further facilitate the intuitive driving and riding experience for the driver, autonomous steering commands may be interpreted by the systems affecting the autonomous manipulation of the steering interface in a manner intended to be particularly amenable, palatable, or ergonomic to a human driver. As a non-limiting example, a damping factor may be applied to any raw steering interface command in order to slow any manipulation of the steering interface when and manipulation of the steering interface by the driver ceases, as well as to control the timing of the adjustment of the position and force applied by the steering system to the steering interface via a steering interface manipulation device so that the steering interface's manipulation is in sync with the vehicle's motion. In this way, the driver may be more likely to find comfort along in an autonomously steered vehicle if the visual steering feedback provided to the steering interface by the autonomous steering system seems less jerky, robotic, or inhuman and thus less disconcerting to any human observer especially when attempting to commandeer the steering interface.

In a number of illustrative variations, if a vehicle comprises a steer-by-wire steering system, it may be necessary for visual feedback from steering to be simulated for the driver in order to deliver an intuitive, semi-autonomous steering experience for the driver. If a vehicle comprising a steer-by-wire steering system comprises fully autonomous steering or semi-autonomous steering that allows driver cooperation or intervention, the steering system may simulate feedback from steering on any interface by which the driver may steer the vehicle. As a non-limiting example, when engaged in fully autonomous steering, the vehicle may automatically rotate a vehicle's handwheel in conjunction with the autonomous steering system turning the vehicle's steerable roadwheels such that a non-intervening or non-cooperating driver may associate the automatic turning of the vehicle's handwheel with the turning of the vehicle's steerable roadwheels and intuit, surmise, or estimate a steering ratio. Thus, if the driver desires to cooperate or intervene in the automated steering, the driver may be less disoriented when attempting to commandeer a steering interface that seems to be unassociated or misaligned with the vehicle's steerable roadwheels. This concept may be factored into any determination of human driver intent by the human appendage tracking module.

In a number of illustrative variations, an autonomous steering system may comprise at least one steering interface, at least one sensor or camera capable of sensing or capturing optical data, as well as at least one logic module for determining from any raw or processed sensed or collected optical data whether a human driver wishes to take control of the at least one steering interface. Such data may include data such as but not limited to human appendage movement velocity, movement speed, movement direction, movement acceleration, appendage position, appendage pose, appendage shape, or any other data pertaining to appendage appearance, movement, or position. In some such cases, any tracked human appendage may be identified and classified by use of a neural network or database such as a local or cloud database as a particular human appendage such as but not limited to a hand, a knee, a finger, an elbow, or any other human appendage. Any such identification and classification may be correlated to any appendage appearance, movement, or position data to provide an accurate context for data collected by cameras or sensors. Any logic module providing context or analysis for data collected by any such cameras or sensors may be referred to as a human appendage tracking module.

In a number of illustrative variations, in order to foster a cooperative steering system, the sensors of an autonomous steering system may be configured to detect and identify steering input as driver input. In some cases, detection of human driver input may cause the autonomous steering system to relinquish all driving tasks to a human driver such as but not limited to acceleration, braking, and steering. In some cases, the autonomous steering system may only relinquish one or more but not all driving tasks in response to human driver input. In some cases, detection of human driver input may cause the steering interface to adjust its position or orientation. As a non-limiting example, in cases where at least one steering interface comprises a hand wheel, the hand wheel may automatically adjust its telescope or rake configuration in order to be more accessible to the human driver upon detecting human driver input. It is also contemplated that any change in control or handing-over of control regarding the autonomous steering system may be accompanied by changes in control or further handing-over of control in other vehicle systems such as but not limited to engine control systems, braking systems, or drive train systems.

In a number of illustrative variations, an autonomous vehicle may comprise at least one human appendage tracking module for determining from any raw or processed sensed or collected optical data whether a human driver wishes to take control of the steering interface. In some such cases, the logic module may determine at least one human driver hand position or hand gesture characteristics and determine therefrom whether the human driver intends to take control of the steering interface. In some such illustrative variations, any processed optical data may be processed along with or correlated to any available data about pressure applied to a steering interface, capacitive touch data from the steering interface, steering interface torque data, steering interface position data, steering interface movement data, or any other data about the movement or position of a steering interface.

In a number of illustrative variations, a neural network may be used to learn and build a library of human driver appendage positions or poses which indicate driver intent. In such cases, the neural network may be tasked with image analysis with the goal of identifying and marking at least one human hand within the image. Similarly, the neural network may be further tasked with classifying the pose of the identified and marked human hand, as well as determining the position of the human hand with respect to a steering interface. Such a neural network may be trained by collecting thousands of images of many differing human drivers and manually marking each human driver's hands in each of the images. The marked images may then be used to train the neural network to recognize the hands of any human driver and to recognize the pose and position of any human driver's hands with respect to a steering interface. Any system or module in communication with such a neural network may monitor the identifications, classifications, and determinations from image analysis and may use operational logic to determine and communicate driver intent to the autonomous driving system. Similarly, the neural network itself may be trained to make this communication. As a non-limiting example, a flicking of all five fingers on one hand or both hands may be a gesture that is to be recognized as a gesture signifying a human driver's intent to relinquish the task of steering to an autonomous steering system. In such a non-limiting example, a trained neural network may be used to recognize that particular hand gesture, as well as others, within a set of collected optical data and communicate to the autonomous steering system via a logic module that the human driver wants to relinquish the task of the steering system in order to exclusively perform steering to the autonomous steering system. Upon receiving such a communication, the autonomous steering system may assert exclusive control of the task of steering the vehicle. It is also contemplated that a neural network may be trained to identify and track the position and pose of any other human driver appendage such as but not limited to a knee, an elbow, or a forearm. In a number of variations, the steering system may be combined with torque data to further improve the reliability of the hands on-off detection. The position of the hands can be used along with other sensors in the steering system or other monitoring systems to understand the drivers intention and prime enact an act autonomous driving assistant system (ADAS) functions ahead of physical contact with the steering interface, such as a steering wheel close, to reduce latency. Sensor fusion of the hands detection with other driver monitoring techniques may also be used to understand driver intentions to assist better initiation of ADAS functions. Adding hands detection based on their position in relationship to the driving interface, such as a steering well, and since her fusing it with other physical steering sensors and driver monitoring systems will provide a much better proxy for drivers intention. Such a system also provides an early indication prior to physical contact with the steering wheel. Currently driver or the demonstration recording your needs to take additional actions such as pressing buttons on a graphical user interface or a physical button in order to start the autonomous mode in a self driving vehicle. This is not very intuitive and causes delays between the time the driver takes hands off of the steering wheel in the vehicle goes autonomous. A number of variations and gestures which may be very similar or the same as the driver taking hands off of the steering interface and in a number of variations the system may use occurrences of that gesture to go into autonomous mode.

In a number of variations in order to interpret driver's intentions, the position of the driver's hands in relationship to the steering interface, such as a steering wheel, may be tracked. The zone of the steering interface will also be detected by a similar pre-trained neural network and the zone will move with the rake and the telescoping steering system. If the driver's hands are in the zone for a particular amount of time and/or with a particular gesture, it can be interpreted as to drivers intention to take over or relinquish controls of the vehicle including the steering system. This signal may be sensor fused with physical sensors like torque to pre-prime driver handover with a torque bump will be eliminated to allow for smooth handover to the driver. By recognizing drivers intention based on their location with respect to the steering wheel faster reactions can be achieved by ADAS functions by pre-processing certain functions based on drivers intention interpretation.

In a number of illustrative variations, a human appendage tracking module may be capable of analyzing optical data to determine that a human driver wishes to take control of a steering interface by use of some other extension of the human driver's body such as but not limited to a knee or thigh. In some such cases, the human appendage tracking module may comprise a neural network that has been trained to track the pose or position at least one appendage of a human driver or is capable of being trained to track the pose or position of at least one appendage of a human driver. Such a human appendage tracking module may be configured to track at least one appendage of a human driver with respect to a particular zone of observation within the cabin of the vehicle. As a non-limiting example, the pose and position of at least one appendage of a human driver may be tracked in relation to the center of a handwheel or with respect to a badge on the handwheel. In this way, the human appendage tracking module may be configured to determine that at least one tracked appendage of a human driver has changed position and crossed over the center of the handwheel. The human appendage tracking system may identify this appendage movement by the human driver as an intentional gesture to the human appendage tracking module that should be interpreted as a request by the human driver for an autonomous steering system to perform some action autonomously such as but not limited to autonomously changing lanes. In some such cases, if the telescoping, raking, or position of the center of a handwheel or badge on the handwheel is moved or adjusted, the zone of observation utilized by at least one optical sensor or camera for purposes of image or data collection and analysis and may also move with the handwheel. Where appropriate, the necessity or desirability for any such sensor or camera to adjust perspective or focus In order to support an adjusted zone of observation may be communicated by the human appendage tracking module to any appropriate mechanism, system, or module for adjusting such camera or sensor.

In a number of illustrative variations, human driver appendage velocity and direction of movement may be tracked by a human appendage tracking module. In some such illustrative variations, at least one of the human appendage tracking module's tracking methods may include a tracking algorithm that accounts for items that partially or fully cover the tracked appendage such as but limited to gloves, watches, pants, shoes, or any other garment, accessory, tool, or object that may fully or partially obscure an optical sensing or imaging system's full view of a human appendage.

In a number of illustrative variations, an optical sensing or imaging system such as but not limited to a camera system, an infrared sensing or imaging system, a sound sensing or imaging system, a laser sensing or imaging system, or any other optical sensing or imaging system may be used to track at least one of a human driver's appendages such as but not limited to hands, forearms, elbows, arms, shoulders, neck, head, thighs, knees, lower legs, feet, or any other body part. An imaging processing algorithm may be used to remove noise from any images or optical data collected such as but not limited to illumination differences, coloration differences, or any other image noise that may affect a human appendage tracking module's ability to recognize, classify, or track a human appendage.

In a number of illustrative variations, while the vehicle is steering autonomously, the driver may attempt to cooperate or intervene in steering the vehicle by interacting with at least one steering interface. In some such cases, upon determining driver intent based at least upon image or optical data analysis as disclosed herein, the steering system may allow the driver to temporarily intervene or cooperate in steering the vehicle. This temporary intervention may be allowed on the basis of a determination, by a human appendage tracking module in combination with other sensors related to the at least one steering interface, that the driver intends only to intervene in the task of steering temporarily. In such cases, the autonomous steering system may calculate the variation to the vehicle travel direction or path as well and may continuously calculate new vehicle travel directions or paths as the driver intervenes such that if the driver stops intervening, the vehicle may begin autonomously steering according to one of the new travel directions or paths.

In a number of illustrative variations, a handwheel serves as the steering interface for an autonomous steering system for a vehicle comprising steerable roadwheels. In some such variations, if the driver intervenes or cooperates in steering, any mechanism used to automatically rotate the vehicle's handwheel in conjunction with the autonomous steering system turning the vehicle's steerable roadwheels may require the driver to apply steering effort with it or against it as the autonomous steering system simultaneously continues to steer the vehicle. In some cases, the autonomous steering system may negotiate the driver input and autonomous steering input to determine a net steering input and utilize the net steering input as a control signal for any turning of the steerable roadwheels and associated force feedback for the steering interface such as but not limited to an automatic turning of a handwheel. As a non-limiting example, if a driver begins to loosely grip a handwheel of a vehicle while the vehicle is in autonomous steering mode, the autonomous steering system may continue to autonomously steer the vehicle and may indicate its intent to steer to the right to the driver by rotating the handwheel to the right in conjunction with turning the steerable roadwheels of the vehicle to the right, however, while the driver still has a loose grip on the handwheel, the driver may sense this attempt to turn right by the autonomous system and may choose to intervene by gripping the handwheel tighter before augmenting the amount of the turn. In some such cases, if the driver attempts to stop the handwheel from turning right, the autonomous steering system may sense this and determine a driver intent from this by correlating driver intent determined by analysis of image data or optical data pertaining to the driver's grip on the handwheel captured within the vehicle cabin to other sensor data useful for determining driver intent such as but not limited to pressure data from any pressure sensors embedded in the handwheel, or from any similarly embedded or associated touch sensors of any sort, or torque sensors trained on, associated with, or embedded in a steering column associated with the handwheel. As a non-limiting example, in some such cases the autonomous system may greatly reduce but not eliminate the amount of force it is applying to the handwheel as a component of the autonomous steering system, thereby making it easy for the driver to commandeer the vehicle without giving the driver the impression that the autonomous steering system has completely relinquished control to a driver. In this way, the driver may be assured that the autonomous steering system is still attempting to control the vehicle and will return to controlling the vehicle after the driver releases the handwheel. As another non-limiting example, in some such cases the autonomous system may completely eliminate the amount of force it is applying to the handwheel as a component of the autonomous steering system, thereby making easy for the driver to commandeer the vehicle and additionally indicating to the driver that the autonomous steering system has completely relinquished control to the driver. In some such cases, the driver may be thereby notified by an audio or visual warning that the autonomous steering system is disabled and no longer attempting to control the vehicle. Additionally, in such cases, the driver may thereby be notified that the steering system will not return to controlling the vehicle after the driver releases the handwheel unless the autonomous steering is re-enabled. In some such cases, re-enabling autonomous steering or driving may be accomplished by way of use by a human driver of a recognized appendage movement or pose. For example, in some such cases, the human driver may utilize a recognized hand gesture such as but not limited to a gesture wherein every digit of the at least one hand of the human driver has flicked from a curled or clenched pose to a fully extended position. This five-finger-flick may be tracked by a human appendage tracking system and may be recognized by a trained neural network, as well as correlated to other sensor data to determine a driver's intent to re-enable autonomous driving or steering from this gesture.

In a number of illustrative variations, if the vehicle is steering autonomously and without driver intervention or cooperation, and the driver attempts to intervene or cooperate in steering, the steering system may determine that the driver intent is low or absent, the steering system may ignore any unintentional input by the driver to steer and instead steer the vehicle in ignorance of the unintentional driver input. As a non-limiting example, in the case of a steer-by-wire system, in the event that the vehicle sensors and systems, or any other system informing the vehicle determines that a steering maneuver is mandatory for safety reasons, the vehicle may ignore any unintentional driver input and perform the steering maneuver autonomously, regardless of any unintentional driver input.

In a number of illustrative variations, the human appendage tracking system may assign at least one confidence level to a tracked appendage. This confidence level may pertain to the human appendage tracking system's confidence that the tracked appendage is performing or has performed a recognized gesture. In such a case, a gesture may register only when the confidence level for that particular gesture for a particular appendage surpasses a certain threshold level. Other sensor data such as but not limited to sensor data pertaining to the steering interface or from sensors embedded in the steering interface may be correlated to image or optical data analyzed by the human appendage tracking system and further inform at least one confidence level. As a non-limiting example, it may be the case that lane-change gesture is only recognized if the confidence in that gesture exceeds 90%. In these cases, some appendage movements that are highly similar to a hand-swipe-across-the-center-of-the-handwheel lane-change gesture but are not made by a human driver to indicate a desire to change lanes, such as when a human driver reaches across its own body to grab a beverage from the center console but does not intend to make a lane change gesture. In some cases, more than human appendage may be tracked simultaneously. In some such cases, when more than one human appendage are tracked and are determined by the human appendage tracking module to have made conflicting gestures or the same gesture with conflicting confidence levels, the steering system or human appendage tracking system may use a prioritization algorithm or decision tree to determine which gesture to count as input, if at all, and in what order to address the gesture input.

In a number of illustrative variations, the steering interface may comprise a joystick, a trackball, a slider, a throttle, a pushbutton, a toggle switch, a lever, a touchscreen, a mouse, or any other known means of user input. In cases where driver input is via a driver interface that yields no obvious opportunity for mechanically driven visual or force feedback, such as but not limited to variations involving a mouse or touchscreen as a primary means of driver input, the automated steering system may indicate reactance to driver input via visual cues such as but not limited to a flash or an animation on a display, audio cues such as but not limited to clicks, beeps, or an instructive voice recording, generated voice, or live voice, or haptic cues such as but not limited to vibration of a screen, or any other cue that may indicate to the driver how driver input—which may be concurrent with autonomous input—is being opposed, cooperated with, integrated or handled by the steering system.

Referring now to FIG. 1, an illustrative variation in which an autonomous steering system 101 is steering a vehicle 102 on a first autonomous path 103. In this illustrative variation, a human appendage tracking module 115 may analyze and mark images or optical data 116 collected by an optical sensing system or imaging system 104 embedded in a rearview mirror 105. The optical sensing system or imaging system 104 may be continuously capturing images or optical data 116 of a zone of observation 106 via a mirror (not shown) positioned behind a human driver 107. When the human driver 107 attempts to intervene in steering the vehicle 102 by engaging a steering interface 108. The optical sensing system or imaging system 104 may capture images or optical data 116 of this attempt at intervention by the human driver 107 by capturing images or optical data 116 of the human driver's 107 hands 109, 110. The human appendage tracking module 115 may analyze the images or optical data 116 for recognizable appendages and recognizable positions or poses with respect to the steering interface 108. In this illustrative variation, the human appendage tracking module 115 has recognized the human driver's 107 hands 109, 110 and has marked them with markings 111, 112 and assigned them gesture confidence ratings 113, 114 by correlating the images or optical data 116 to the knowledge of a neural network 117 regarding images or optical data of recognizable human hand gestures in the context of steering a vehicle via a handwheel with human hands. The human appendage tracking module 115 may correlate these gesture confidence ratings 113,114, to touch or pressure data 118, 119, collected from touch or pressure sensors 121,122, embedded in the steering interface 108 for the purpose of determining the human driver's 107 intent 120 while engaging the steering interface 108 in this way. In this illustrative variation, the human appendage tracking module 115 may determine by correlating the gesture confidence ratings 113, 114, to the touch or pressure data 118,119, from touch or pressure sensors 121, 122 that the human driver 107's intent 120 is to intervene in steering. This intent 120 may be communicated by the human appendage tracking module 115 to the autonomous steering system 101, which may then relinquish control of steering the vehicle to the human driver 107. The human driver 107 may then manually steer the vehicle 102 via the steering interface 108, free from the influence of the autonomous steering system 101.

Figure 2:
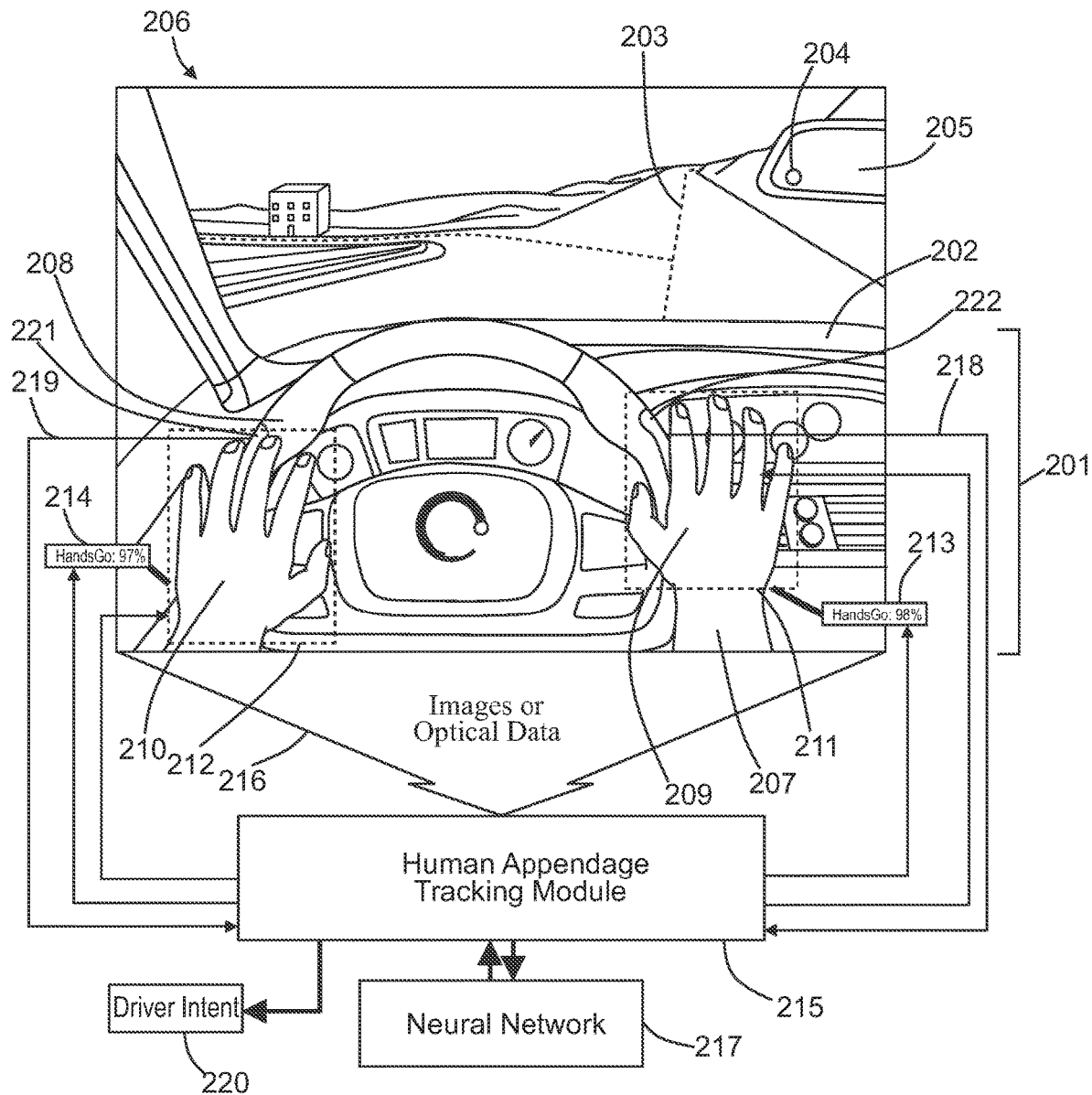
FIG. 2 depicts an illustrative variation in which an image representative of a camera image or optical sensor data depicting a human driver interacting with a steering interface of an autonomous steering system is being analyzed and marked by a human appendage tracking module. In this illustrative variation, the human appendage tracking module utilizes data from at least one optical sensor or an image from at least one camera to determine that a human driver wishes to relinquish control of a steering interface based at least upon at least one of the human driver's hand position or hand pose characteristics according to a number of variations.

Referring now to FIG. 2, an illustrative variation in which a human driver 207 is at first manually steering a vehicle 202 comprising an autonomous steering system 201. In this illustrative variation, a human appendage tracking module 215 may analyze and mark images or optical data 216 collected by an optical sensing system or imaging system 204 embedded in a rearview mirror 205. The optical sensing system or imaging system 204 may be continuously capturing images or optical data 216 of a zone of observation 206 via a mirror (not shown) positioned behind a human driver 207. The human driver 207 may begin to disengage the steering interface 108 by releasing its grip on the steering interface 208. The optical sensing system or imaging system 204 may capture images or optical data 216 of this disengagement by the human driver 207 by capturing images or optical data 216 of the human driver's 207 hands 209, 210. The human appendage tracking module 215 may analyze the images or optical data 216 for recognizable appendages and recognizable positions or poses with respect to the steering interface 208. In this illustrative variation, the human appendage tracking module 215 has recognized the human driver's 207 hands 209, 210 and has marked them with markings 211, 212 and assigned them gesture confidence ratings 213, 214 by correlating the images or optical data 216 to the knowledge of a neural network 217 regarding images or optical data of recognizable human hand gestures in the context of steering a vehicle via a handwheel with human hands. The human appendage tracking module 215 may correlate these gesture confidence ratings 213,214, to touch or pressure data 218, 219, collected from touch or pressure sensors 221,222, embedded in the steering interface 208 for the purpose of determining the human driver's 207 intent 220 when disengaging the steering interface 208 in this way. In this illustrative variation, the human appendage tracking module 215 may determine by correlating the gesture confidence ratings 213, 214, to the touch or pressure data 218, 219, from touch or pressure sensors 221, 222 that the human driver 207's intent 220 is to disengage the steering interface 208 and relinquish the task of steering the vehicle 202 to the autonomous steering system 201. This intent 220 may be communicated by the human appendage tracking module 215 to the autonomous steering system 201, which may then take exclusive control of the task of steering the vehicle 207. The autonomous steering system 201 may then begin steering the vehicle 202 autonomously along an autonomous path 203 and exclude any steering input by the human driver 207 that is determined to be unintentional.

Figure 3A:
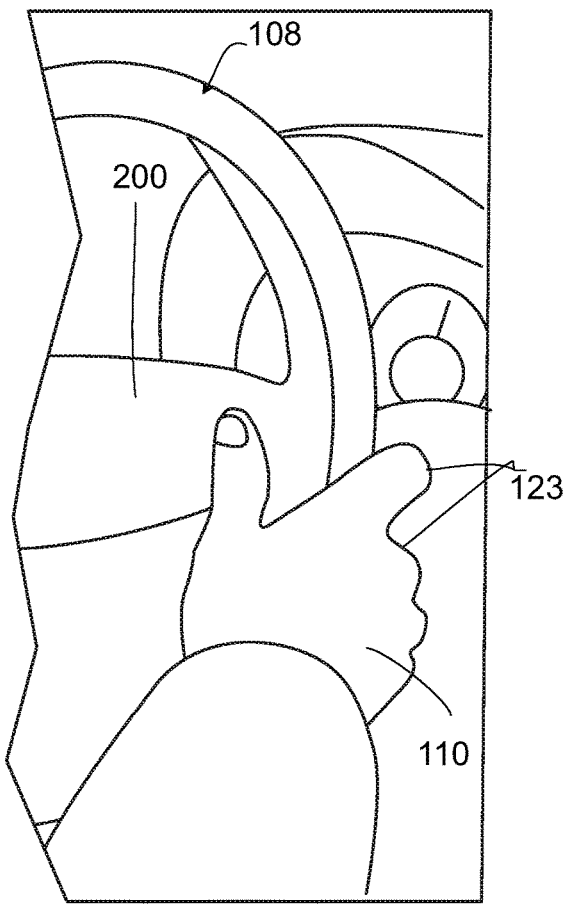
FIG. 3A is an illustration of a driver's hand on a steering wheel with a plurality of fingers curled around and/or grasping the steering wheel according to a number of variations.

FIG. 3A is an illustration of a driver's hand 110 on a steering wheel 108 with a plurality of fingers 123 curled around and/or grasping the steering wheel 108 according to a number of variations.

Figure 3B:
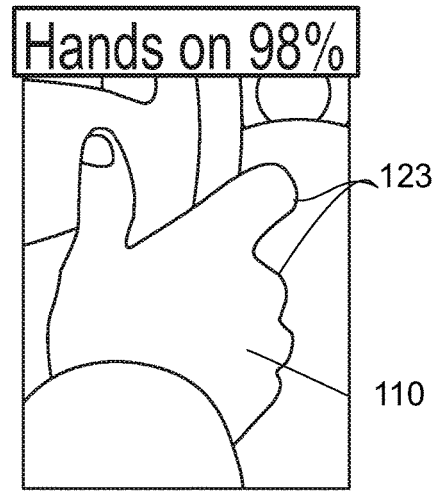
FIG. 3B illustrates the driver's hand, for example as illustrated in FIG. 3A, in the field of view of an optical sensor positioned to view a front face 200 of the steering wheel according to a number of variations.

FIG. 3B illustrates the driver's hand 110, for example as illustrated in FIG. 3A, in the field of view of an optical sensor positioned to view a front face 200 of the steering wheel according to a number of variations.

Figure 3C:
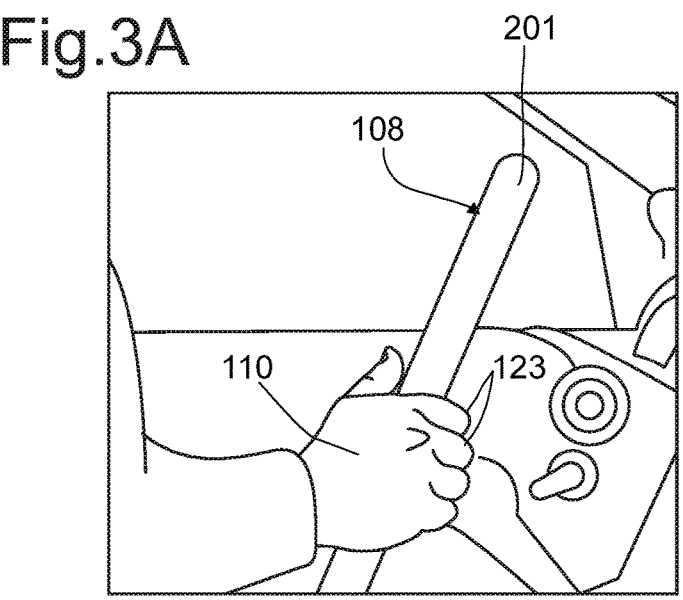
FIG. 3C illustrates the driver's hand, for example as illustrated in FIG. 3A, in the field of view of an optical sensor positioned to view a side edge of the steering wheel according to a number of variations.

FIG. 3C illustrates the driver's hand 110, for example as illustrated in FIG. 3A, in the field of view of an optical sensor positioned to view a side edge 201 of the steering wheel 110 according to a number of variations.

Figure 4A:
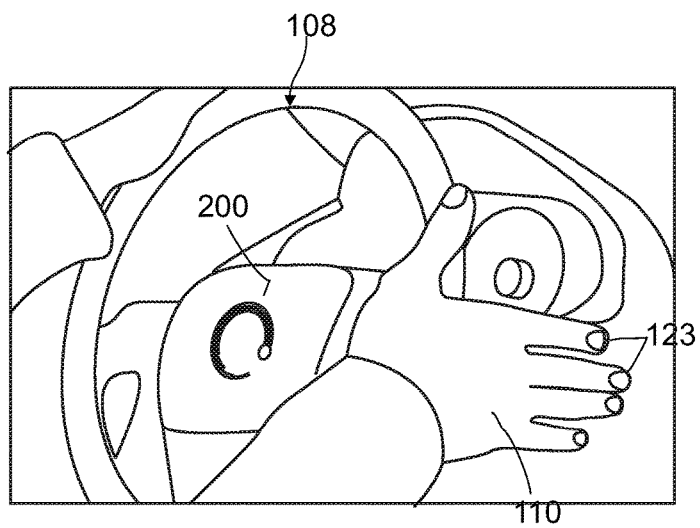
FIG. 4A is an illustration of a driver's hand in the field of view of an optical sensor positioned to view a front face of the steering wheel, wherein the driver is making a hand gesture that indicate the driver's intention to turnover control of steering to the vehicle autonomous driving system by flicking a plurality of fingers of the driver's hand wherein the plurality of fingers are extend and are not curled around the steering wheel of grasping the steering wheel according to a number of variations.

FIG. 4A is an illustration of a driver's hand 110 in the field of view of an optical sensor positioned to view a front face 200 of the steering wheel 108, wherein the driver is making a hand gesture that indicate the driver's intention to turnover control of steering to the vehicle autonomous driving system by flicking a plurality of fingers 123 of the driver's hand wherein the plurality of fingers 123 are extend and are not curled around the steering wheel of grasping the steering wheel according to a number of variations.

Figure 4B:
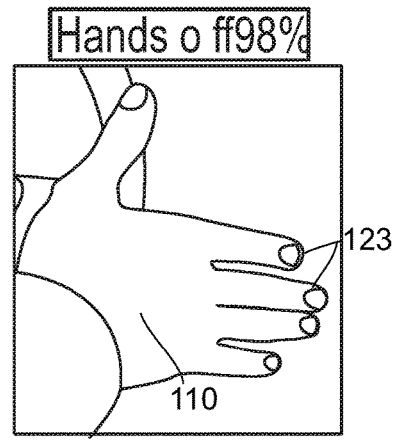
FIG. 4B illustrates the driver's hand, for example as illustrated in FIG. 4A, in the field of view of an optical sensor positioned to view a front face of the steering wheel according to a number of variations.

FIG. 4B illustrates the driver's hand 110, for example as illustrated in FIG. 4A, in the field of view of an optical sensor positioned to view a front face of the steering wheel 200 according to a number of variations.

Figure 4C:
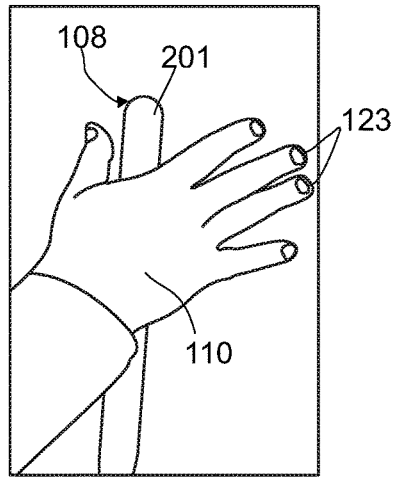
FIG. 4C is an illustration of a driver's hand in the field of view of an optical sensor positioned to view a side edge of the steering wheel, wherein the driver is making a hand gesture that indicate the driver's intention to turnover control of steering to the vehicle autonomous driving system by flicking a plurality of fingers of the driver wherein the plurality of fingers are extend and are not curled around the steering wheel or grasping the steering wheel according to a number of variations.

FIG. 4C is an illustration of a driver's hand 110 in the field of view of an optical sensor positioned to view a side edge 201 of the steering wheel 108, wherein the driver is making a hand gesture that indicate the driver's intention to turnover control of steering to the vehicle autonomous driving system by flicking a plurality of fingers 123 of the driver wherein the plurality of fingers 123 are extend and are not curled around the steering wheel 108 or grasping the steering wheel according to a number of variations.

Figure 4D:
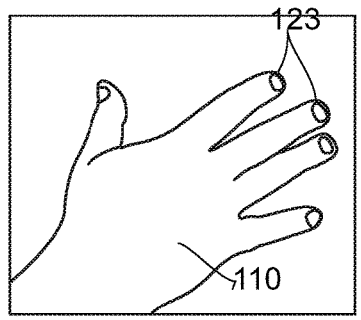
FIG. 4D illustrates data that an optical sensor may produce of a driver's hand in the field of view of an optical sensor positioned to view a side edge of the steering wheel, wherein the driver is making a hand gesture that indicate the driver's intention to turnover control of steering to the vehicle autonomous driving system by flicking a plurality of fingers of the driver wherein the plurality of fingers are extend and are not curled around the steering wheel of grasping the steering wheel according to a number of variations.

FIG. 4D illustrates data that an optical sensor may produce of a driver's hand 110 in the field of view of an optical sensor positioned to view a side edge of the steering wheel, wherein the driver is making a hand gesture that indicate the driver's intention to turnover control of steering to the vehicle autonomous driving system by flicking a plurality of fingers 123 of the driver wherein the plurality of fingers are extend and are not curled around the steering wheel of grasping the steering wheel according to a number of variations.

Figure 4E:
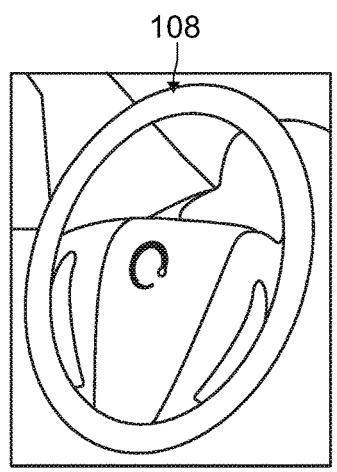
FIG. 4E is an illustration of a driver's indicating the driver's intention to turnover control of steering to the vehicle autonomous driving system by completely removing the driver's hands from the steering wheel the steering wheel according to a number of variations.

FIG. 4E is an illustration of a driver's indicating the driver's intention to turnover control of steering to the vehicle autonomous driving system by completely removing the driver's hands from the steering wheel the steering wheel 108 according to a number of variations.

Figure 5A:
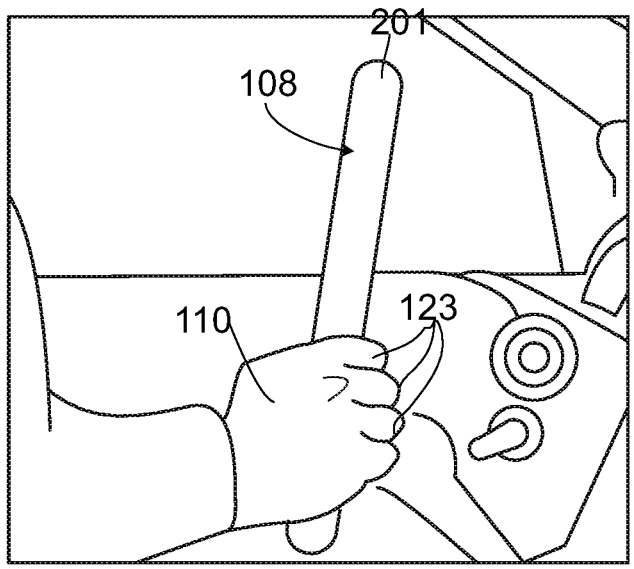
FIG. 5A illustrates a driver's hand in the field of view of an optical sensor positioned to view a side edge of the steering wheel, wherein the a plurality of fingers of a driver's hand are curled around the steering wheel indicating the driver's intention to take over control of the steering system of the vehicle. according to a number of variations.

FIG. 5A illustrates a driver's hand 110 in the field of view of an optical sensor positioned to view a side edge 201 of the steering wheel 108, wherein the a plurality of fingers 123 of a driver's hand 110 are curled around the steering wheel indicating the driver's intention to take over control of the steering system of the vehicle. according to a number of variations.

Figure 5B:
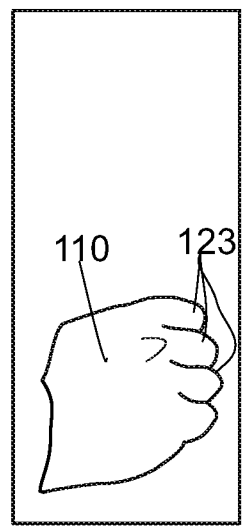
FIG. 5B illustrates data that an optical sensor may produce of a driver's hand in the field of view of an optical sensor positioned to view a side edge of the steering wheel, wherein the a plurality of fingers of a driver's hand are curled around the steering wheel indicating the driver's intention to take over control of the steering system of the vehicle.

FIG. 5B illustrates data that an optical sensor may produce of a driver's hand 110 in the field of view of an optical sensor positioned to view a side edge of the steering wheel, wherein the a plurality of fingers 123 of a driver's hand 110 are curled around the steering wheel indicating the driver's intention to take over control of the steering system of the vehicle.

Figure 6A:
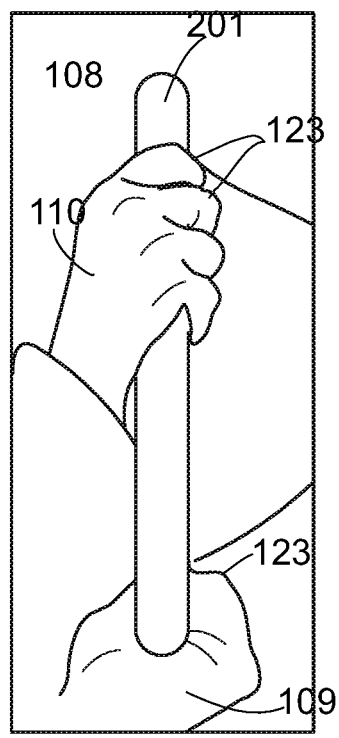
FIG. 6A illustrates a driver's hands in the field of view of an optical sensor positioned to view a side edge of the steering wheel, wherein the a plurality of fingers of each of a driver's hands are curled around the steering wheel indicating the driver's intention to take over control of the steering system of the vehicle according to a number of variations.

FIG. 6A illustrates a driver's hands 109, 110 in the field of view of an optical sensor positioned to view a side edge 201 of the steering wheel 108, wherein the a plurality of fingers 123 of each of a driver's hands 109, 110 are curled around the steering wheel 108 indicating the driver's intention to take over control of the steering system of the vehicle. according to a number of variations.

Figure 6B:
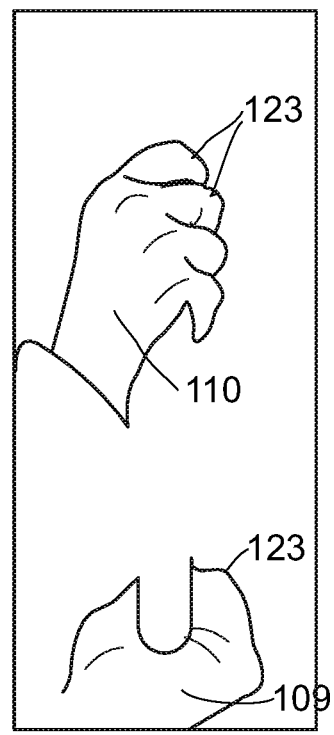
FIG. 6B illustrates data that an optical sensor may produce of a driver's hands in the field of view of an optical sensor positioned to view a side edge of the steering wheel, wherein the a plurality of fingers of each of a driver's hands are curled around the steering wheel indicating the driver's intention to take over control of the steering system of the vehicle according to a number of variations.

FIG. 6B illustrates data that an optical sensor may produce of a driver's hands 109, 110 in the field of view of an optical sensor positioned to view a side edge of the steering wheel, wherein the a plurality of fingers 123 of each of a driver's hands 109, 110 are curled around the steering wheel indicating the driver's intention to take over control of the steering system of the vehicle.

Figure 7:
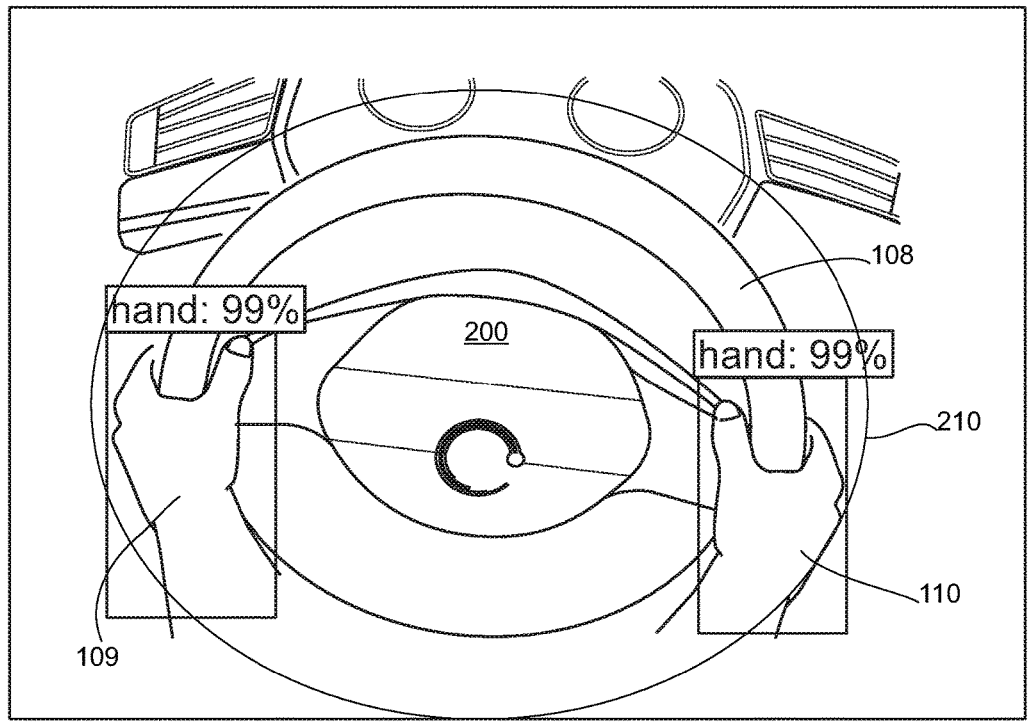
FIG. 7 illustrates the field of view of an optical sensor positioned to view a front face of the steering wheel and showing a detection zone that the driver has place his hands with indicating the driver's intention to take control of the steering system of the vehicle.
Figure 8:
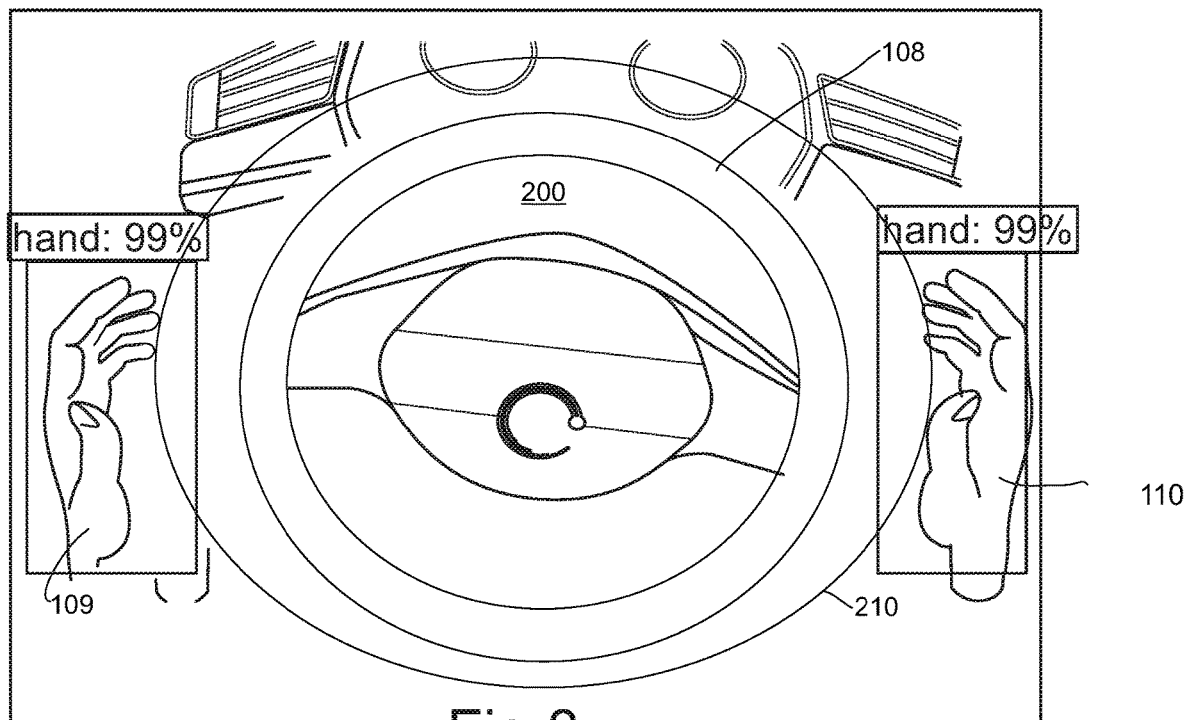
FIG. 8 illustrates the field of view of an optical sensor according to a number of variations.

FIG. 7 illustrates the field of view of an optical sensor positioned to view a front face 200 of the steering wheel 108 and showing a detection zone 210 that the driver has place his hands 109, 110 with indicating the driver's intention to take control of the steering system of the vehicle. As illustrated in FIG. 7 object recognition software may be used to determine within a predetermined level of acceptability/confidence, for example, within a 99% confidence level that the driver's hand 109, 110 are within the detection zone 210. As shown in FIGS. 7 and 8 the detection zone 210 may be generally oval shaped, but may be round, square, rectangular, rhombus like or any other shape which would be sufficient large enough so that a predetermined portion or sufficient portion of at least one of the driver's hands place on a steering interface would be with the detection zone 210 indicating the driver's intention to take control of the steering system of the vehicle.

FIG. 8 illustrates the field of view of an optical sensor positioned to view a front face of the steering wheel and showing a detection zone that the driver has moved his hands outside of indicating the driver's intention to relinquish control of the steering system of the vehicle to the autonomous driving system according to a number of variations. As illustrated in FIG. 8 object recognition software may be used to determine within a predetermined level of acceptability/confidence, for example, within a 99% confidence level that that a predetermined portion or sufficient portion of each of the driver's hands 109, 110 are outside the detection zone 210 indicating the driver's intention to relinquish control of the steering system of the vehicle to the autonomous driving system.

In a number of illustrative variations, any number of modules may be combined together or broken into smaller modules.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: an autonomous steering system comprising a steering interface and constructed and arranged to concurrently accept and interpret human driver steering commands input by a human driver via at least one steering interface and autonomous steering commands input by an autonomous steering system, wherein the autonomous steering system is capable of shifting between at least a first steering mode and a second steering mode, the first steering mode being a steering mode in which the steering occurs exclusively on the basis of autonomous steering commands produced by the autonomous steering system and the second steering mode being a steering mode in which steering occurs exclusively on the basis of human driver steering commands produced by a human driver via the manipulation of the at least one steering interface, wherein the product further comprises at least one camera or optical sensor configured to track at least one of the position or pose of a human appendage and wherein the autonomous steering system is configured to shift between steering modes based at least upon the tracked position or pose of the at least one human appendage.

Variation 2 may include the product of any of variations 1, or 3-11 wherein the autonomous steering system is further capable of shifting to a third steering mode wherein the at least one steering interface is manipulated by both the human driver and the autonomous steering system.

Variation 3 may include the product of any of variations 1-2, or 4-11 wherein the at least one camera or optical sensor comprises a stereo camera arrangement.

Variation 4 may include the product of any of variations 1-3, or 5-11 wherein the product wherein the least one camera or optical sensor is configured to track the movement speed of the at least one human appendage.

Variation 5 may include the product of any of variations 1-4, or 6-11 wherein the least one camera or optical sensor is configured to track the proximity of the at least one human appendage to the at least one steering interface.

Variation 6 may include the product of any of variations 1-5, or 7-11 wherein the product further comprises at least one torque sensor for sensing torque input to the steering interface by the human driver.

Variation 7 may include the product of variation 6 wherein the torque input is torque sensed on a steering on column.

Variation 8 may include the product of any of variations 1-7, or 9-11 wherein the product further comprises at least one pressure sensor coupled to the steering interface for sensing pressure applied to the steering interface by the human driver.

Variation 9 may include the product of any of variations 1-8, or 10 wherein the product further comprises at least one capacitive touch sensor coupled to the steering interface for sensing a change in capacitance that applies at the capacitive touch sensor when the human driver touches the steering interface.

Variation 10 may include the product of any of variations 1-9 wherein the configuration of the at least one optical sensor or camera for tracking the position or pose of the at least one human appendage comprises at least one camera positioned to capture images of at least of the human driver's hands on or near a steering wheel.

Variation 11 may include the product of variation 10 wherein the configuration of the autonomous steering to shift between steering modes based at least upon the tracked position or pose of the at least one human appendage comprises the use of an image analysis system to determine that every digit of the at least one hand of the human driver has flicked from a curled or clenched pose to a fully extended position and wherein the autonomous steering system is configured to change steering modes based at least upon this determination.

Variation 12 may include a method comprising: using at least one camera or optical sensor to track at least one of the position or pose of at least one appendage of a human driver; producing correlation data by correlating the at least one of the position or pose of the at least one appendage of the human driver to data collected from at least one steering interface or from at least one sensor configured to sense interaction with the at least one steering interface by the human driver; and, changing a steering mode of an autonomous steering system based at least upon the correlation data.

Variation 13 may include the method of variation 12, or 14-17 wherein the at least one camera or optical sensor comprises a stereo camera arrangement.

Variation 14 may include the method of any of variations 12-13, or 15-17 wherein the data collected from at least one steering interface or from at least one sensor configured to sense interaction with the at least one steering interface by the human driver comprises data from at least one capacitive touch sensor embedded in the at least one steering interface.

Variation 15 may include the method of any of variations 12-14 or 16-17 wherein the data collected from at least one steering interface or from at least one sensor configured to sense interaction with the at least one steering interface by the human driver comprises at least one torque sensor for sensing torque input to the steering interface by the human driver.

Variation 16 may include the method of variation 15 wherein the torque input is torque sensed on a steering on column.

Variation 17 may include the method of any of variations 12-16 wherein the data collected from at least one steering interface or from at least one sensor configured to sense interaction with the at least one steering interface by the human driver comprises at least one pressure sensor coupled to the steering interface for sensing pressure applied to the steering interface by the human driver.

Variation 18 may include a product comprising at least one steering interface of an autonomous steering system for a vehicle; at least one optical sensor or camera for tracking at least one of the pose or position of at least one human driver appendage; and, at least one sensor other than an optical sensor embedded in the steering interface.

Variation 19 may include the product of any of variations 18 or 20 wherein the at least one sensor other than an optical sensor is a capacitive touch sensor.

Variation 20 may include the product of any of variations 18-19 wherein the at least one sensor other than an optical sensor is a pressure sensor.

Variation 21 may include a product including: an autonomous steering system comprising a steering interface and constructed and arranged to concurrently accept and interpret human driver steering commands input by a human driver via at least one steering interface and autonomous steering commands input by an autonomous steering system, wherein the autonomous steering system is capable of shifting between at least a first steering mode and a second steering mode, the first steering mode being a steering mode in which the steering occurs exclusively on the basis of autonomous steering commands produced by the autonomous steering system and the second steering mode being a steering mode in which steering occurs exclusively on the basis of human driver steering commands produced by a human driver via the manipulation of the at least one steering interface, wherein the product further comprises at least one camera or optical sensor configured to track at least one of the position or pose of a human appendage and wherein the autonomous steering system is configured to shift between steering modes based at least upon the tracked position or pose of the at least one human appendage, wherein the at least one camera or optical sensor is positioned to view a front face of the steering interface and wherein the autonomous drive system is capable of identifying a detection zone with the at least one camera or optical sensor and determine if a predetermined portion of the human appendage has placed in the detection zone and if so shift to the second mode, and wherein autonomous drive system is capable of determining if a predetermined portion of the human appendage has placed outside of the detection zone and if so shift to the first mode.

Variation 22 may include a product as set forth in variation 21 wherein the human appendage comprises a human hand.

Variation 23 may include a method including: providing an autonomous steering system comprising a steering interface and constructed and arranged to concurrently accept and interpret human driver steering commands input by a human driver via at least one steering interface and autonomous steering commands input by an autonomous steering system, wherein the autonomous steering system is capable of shifting between at least a first steering mode and a second steering mode, the first steering mode being a steering mode in which the steering occurs exclusively on the basis of autonomous steering commands produced by the autonomous steering system and the second steering mode being a steering mode in which steering occurs exclusively on the basis of human driver steering commands produced by a human driver via the manipulation of the at least one steering interface, wherein the product further comprises at least one camera or optical sensor configured to track at least one of the position or pose of a human appendage and wherein the autonomous steering system is configured to shift between steering modes based at least upon the tracked position or pose of the at least one human appendage, wherein the at least one camera or optical sensor is positioned to view a front face of the steering interface and wherein the autonomous drive system is capable of identifying a detection zone with the at least one camera or optical sensor and determining if a predetermined portion of the human appendage has placed in the detection zone and if so shifting to the second mode, and determining if a predetermined portion of the human appendage has placed outside of the detection zone and if so shifting to the first mode.

Variation 24 may include a method as set forth in variation 23 wherein the human appendage comprises a human hand.

The above description of select variations within the scope of the invention is merely illustrative in nature and, thus, variations or variants thereof are not to be regarded as a departure from the spirit and scope of the invention.

What is claimed is:

1. A product comprising:
    an autonomous steering system comprising a steering interface and constructed and arranged to concurrently accept and interpret human driver steering commands input by a human driver via at least one steering interface and autonomous steering commands input by an autonomous steering system, wherein the autonomous steering system is capable of shifting between at least a first steering mode and a second steering mode, the first steering mode being a steering mode in which the steering occurs exclusively on the basis of autonomous steering commands produced by the autonomous steering system and the second steering mode being a steering mode in which steering occurs exclusively on the basis of human driver steering commands produced by a human driver via the manipulation of the at least one steering interface, wherein the product further comprises at least one camera or optical sensor configured to track at least one of the position or pose of a human appendage and wherein the autonomous steering system is configured to shift between steering modes based at least upon the tracked position or pose of the at least one human appendage, wherein the configuration of the at least one optical sensor or camera for tracking the position or pose of the at least one human appendage comprises at least one camera positioned to capture images of at least of the human driver's hands on or near a steering wheel, wherein the configuration of the autonomous steering to shift between steering modes based at least upon the tracked position or pose of the at least one human appendage comprises the use of an image analysis system to determine that every digit of the at least one hand of the human driver has flicked from a curled or clenched pose to a fully extended position and wherein the autonomous steering system is configured to change steering modes based at least upon this determination.

2. The product of claim 1 wherein the autonomous steering system is further capable of shifting to a third steering mode wherein the at least one steering interface is manipulated by both the human driver and the autonomous steering system.

3. The product of claim 2 wherein the at least one camera or optical sensor comprises a stereo camera arrangement.

4. The product of claim 2 wherein the product wherein the least one camera or optical sensor is configured to track the movement speed of the at least one human appendage.

5. The product of claim 2 wherein the least one camera or optical sensor is configured to track the proximity of the at least one human appendage to the at least one steering interface.

6. The product of claim 2 wherein the product further comprises at least one torque sensor for sensing torque input to the steering interface by the human driver.

7. The product of claim 6 wherein the torque input is torque sensed on a steering on column.

8. The product of claim 2 wherein the product further comprises at least one pressure sensor coupled to the steering interface for sensing pressure applied to the steering interface by the human driver.

9. The product of claim 2 wherein the product further comprises at least one capacitive touch sensor coupled to the steering interface for sensing a change in capacitance that applies at the capacitive touch sensor when the human driver touches the steering interface.

10. A method comprising:
    using at least one camera or optical sensor to track at least one of the position or pose of at least one appendage of a human driver;
    producing correlation data by correlating the at least one of the position or pose of the at least one appendage of the human driver to data collected from at least one steering interface or from at least one sensor configured to sense interaction with the at least one steering interface by the human driver; and,
    changing a steering mode of an autonomous steering system based at least upon the correlation data, wherein using at least one optical sensor or camera for tracking the position or pose of the at least one human appendage comprises at least one camera positioned to capture images of at least of the human driver's hands on or near a steering wheel, using an image analysis system to determine that every digit of the at least one hand of the human driver has flicked from a curled or clenched pose to a fully extended position and wherein the autonomous steering system is configured to change steering modes based at least upon this determination.

11. The method of claim 10 wherein the at least one camera or optical sensor comprises a stereo camera arrangement.

12. The method of claim 10 wherein the data collected from at least one steering interface or from at least one sensor configured to sense interaction with the at least one steering interface by the human driver comprises data from at least one capacitive touch sensor embedded in the at least one steering interface.

13. The method of claim 10 wherein the data collected from at least one steering interface or from at least one sensor configured to sense interaction with the at least one steering interface by the human driver comprises at least one torque sensor for sensing torque input to the steering interface by the human driver.

14. The method of claim 13 wherein the torque input is torque sensed on a steering on column.

15. The method of claim 10 wherein the data collected from at least one steering interface or from at least one sensor configured to sense interaction with the at least one steering interface by the human driver comprises at least one pressure sensor coupled to the steering interface for sensing pressure applied to the steering interface by the human driver.

16. A product comprising at least one steering interface of an autonomous steering system for a vehicle;
at least one optical sensor or camera for tracking at least one of the pose or position of at least one human driver appendage; and,
at least one sensor other than an optical sensor embedded in the steering interface.

17. The product of claim 16 wherein the at least one sensor other than an optical sensor is a capacitive touch sensor.

18. The product of claim 16 wherein the at least one sensor other than an optical sensor is a pressure sensor.

19. A product comprising:
an autonomous steering system comprising a steering interface and constructed and arranged to concurrently accept and interpret human driver steering commands input by a human driver via at least one steering interface and autonomous steering commands input by an autonomous steering system, wherein the autonomous steering system is capable of shifting between at least a first steering mode and a second steering mode, the first steering mode being a steering mode in which the steering occurs exclusively on the basis of autonomous steering commands produced by the autonomous steering system and the second steering mode being a steering mode in which steering occurs exclusively on the basis of human driver steering commands produced by a human driver via the manipulation of the at least one steering interface, wherein the product further comprises at least one camera or optical sensor configured to track at least one of the position or pose of a human appendage and wherein the autonomous steering system is configured to shift between steering modes based at least upon the tracked position or pose of the at least one human appendage, wherein the at least one camera or optical sensor is positioned to view a front face of the steering interface and wherein the autonomous drive system is capable of identifying a detection zone with the at least one camera or optical sensor and determine if a predetermined portion of the human appendage has placed in the detection zone and if so shift to the second mode, and wherein autonomous drive system is capable of determining if a predetermined portion of the human appendage has placed outside of the detection zone and if so shift to the first mode.

20. A product as set forth in claim 19 wherein the human appendage comprises a human hand.

21. A method as set forth in claim 19 wherein the human appendage comprises a human hand.

22. A method comprising:
providing an autonomous steering system comprising a steering interface and constructed and arranged to concurrently accept and interpret human driver steering commands input by a human driver via at least one steering interface and autonomous steering commands input by an autonomous steering system, wherein the autonomous steering system is capable of shifting between at least a first steering mode and a second steering mode, the first steering mode being a steering mode in which the steering occurs exclusively on the basis of autonomous steering commands produced by the autonomous steering system and the second steering mode being a steering mode in which steering occurs exclusively on the basis of human driver steering commands produced by a human driver via the manipulation of the at least one steering interface, wherein the product further comprises at least one camera or optical sensor configured to track at least one of the position or pose of a human appendage and wherein the autonomous steering system is configured to shift between steering modes based at least upon the tracked position or pose of the at least one human appendage, wherein the at least one camera or optical sensor is positioned to view a front face of the steering interface and wherein the autonomous drive system is capable of identifying a detection zone with the at least one camera or optical sensor and determining if a predetermined portion of the human appendage has placed in the detection zone and if so shifting to the second mode, and determining if a predetermined portion of the human appendage has placed outside of the detection zone and if so shifting to the first mode.

* * * * *